United States Patent
Yoshida et al.

(10) Patent No.: US 6,466,267 B1
(45) Date of Patent: *Oct. 15, 2002

(54) SYSTEM FOR PERFORMING SELECTIVE DETECTION OF IMAGE SIGNAL PEAKS AND CAMERA EMPLOYING THE SYSTEM (75) Inventors: Shinya Yoshida; Yasuhito Maki, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/354,849

(22) Filed: Jul. 16, 1999

Related U.S. Application Data (62) Division of application No. 08/684,275, filed on Jul. 17, 1996, now Pat. No. 6,166,771.

(30) Foreign Application Priority Data

Jul. 18, 1995 (JP) .............................. 7-181260

(51) Int. Cl.[7] .................... G03B 13/00; H04N 5/238
(52) U.S. Cl. ................... 348/354; 348/296; 348/364
(58) Field of Search .................. 348/207, 222, 348/229, 345–356, 362–365, 296, 297, 298, 311, 312; 396/96, 127; H04N 5/238; G03B 13/00

(56) References Cited

U.S. PATENT DOCUMENTS

| 4,872,058 A | 10/1989 | Baba et al. .................. 348/352 |
| 5,128,768 A | 7/1992 | Suda et al. .................. 348/352 |
| 5,357,280 A | 10/1994 | Masao et al. ................ 348/349 |
| 5,363,137 A | 11/1994 | Suga et al. .................. 348/302 |
| 5,615,399 A | 3/1997 | Akashi et al. ............... 396/128 |
| 5,629,735 A | 5/1997 | Kanida et al. ............... 348/350 |
| 5,666,567 A | * 9/1997 | Kusaka ........................ 348/356 |
| 5,739,858 A | 4/1998 | Suda et al. .................. 348/355 |
| 5,982,430 A | * 11/1999 | Torii ........................... 348/356 |

FOREIGN PATENT DOCUMENTS

EP  0 605 240 A  7/1994  .......... H04N/5/232

OTHER PUBLICATIONS

Patent Abstracts of Japan, vol. 016, No. 550 (E–1292), Nov. 19, 1992, & JP 04 208780 A (Sankyo Seiki Mfg. Co. Ltd.) Jul. 30, 1992.

* cited by examiner

Primary Examiner—Ngoc-Yen Vu
(74) Attorney, Agent, or Firm—Frommer Lawrence & Haug LLP; William S. Frommer; Bruno Polito

(57) ABSTRACT

An adaptive peak value detector, wherein the peak value for a peak hold section is detected, the peak hold section being selected by a peak hold control circuit. A solid-state imaging sensor generates pixel signals representative of an image and the peak value of portions of the pixel signals is detected. The exposure time of the sensor is adjusted as a function of the detected peak value and auto-focusing of the image for the camera is carried out on the basis of the image received during the adjusted exposure time.

5 Claims, 8 Drawing Sheets

|  | D0 | D1 | D2 | D3 |
|---|---|---|---|---|
| DESIGNATE SECTION A | L | H | L | H |
| DESIGNATE SECTION B | H | L | H | L |
| DESIGNATE SECTION C | H | H | H | H |

SYSTEM FOR PERFORMING SELECTIVE DETECTION OF IMAGE SIGNAL PEAKS AND CAMERA EMPLOYING THE SYSTEM

This application is a divisional of U.S. application Ser. No. 08/684,275 filed Jul. 17, 1996, now U.S. Pat. No. 6,166,771

BACKGROUND OF THE INVENTION

The present invention relates to auto-focusing and, more particularly, to auto-focusing by use of a solid-state imaging device.

Auto-focusing is initiated by projecting an image through a lens onto a detection device which is made up of imaging elements. The lens is, then, focussed according to a comparison of image signals generated by the imaging elements. Since auto-focusing is performed on the basis of the detected image, it is important to accurately detect the image projected onto the detection device.

Figure 11:
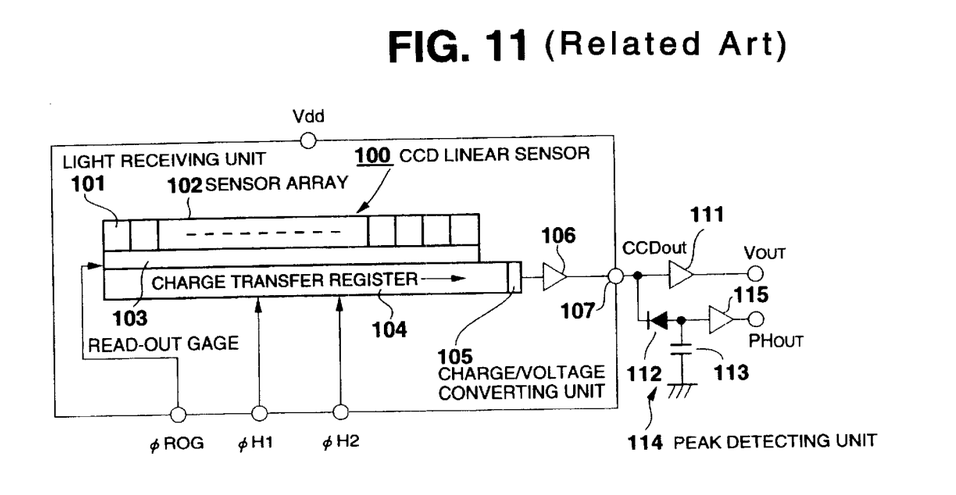
FIG. 11 is a block diagram of a linear sensor.

The detection device for detecting the image may be embodied, for example, as a Charge Coupled Device (CCD) linear sensor 100 shown in FIG. 11 which is a solid-state imaging device. Fundamentally, the CCD linear sensor includes light receiving units 101, i.e., the imaging elements, which receive the projected image and generate a pixel output signal VOUt composed of a series of voltage signals representing pixels of the image. The exposure time, that is, the time in which the CCD linear sensor is exposed to light, is determined by the level of a peak value $PH_{out}$ for the pixel voltages. Thus, the pixel output signal $V_{out}$ is employed to generate an auto-focusing signal and the signal $PH_{out}$ is employed to control the exposure time so that an output level of the pixel output signal $V_{out}$ is appropriate for auto-focusing.

The light receiving units 101 of the CCD linear sensor that receive the image comprise a sensor array 102. It will be appreciated that the sensor array may be linear, i.e., one-dimensional, because auto-focusing does not necessarily require detecting signals for an entire, i.e., two-dimensional, image. That is, the CCD linear sensor need only receive a single line of the image and it is sufficient that the sensor array is linear. Each light receiving unit in the sensor array converts incident light into an electric charge and accumulates the electric charge during the exposure time. The amount of charge in each light receiving unit corresponds to the amount of incident light accumulated over the exposure time and these accumulated charges, therefore, represent the image along the linear sensor array.

A read-out gate controlled by a read-out gate pulse $\phi ROG$ initiates the reading of the charges. The charges are read out by transferring each charge from the sensor array of light receiving units; and the transfer of charges is timed by transfer pulses $\phi H_1$, $\phi H_2$, which are essentially clocks that trigger the light receiving units, the read-out gate and the charge transfer register to transfer the accumulated charges. The shifted charges are transmitted serially, via charge transfer register 104, to a charge\voltage converting unit 105. The charge\voltage converting unit converts each accumulated charge into a corresponding voltage and stores these voltages in a buffer 106. The buffer holds these voltages for transmission to the output terminal 107 as the output signal $CCD_{out}$ from the CCD linear sensor.

A buffer 111 stores and holds the output signal $CCD_{out}$ at an output thereof as the pixel signals $V_{out}$. The pixel signals $V_{out}$ are a series of voltage signals representing the accumulated charge in each of the light receiving units, or pixels.

Auto-focusing is achieved, for example, by comparing the signal levels of each pixel voltage in the pixel output signal $V_{out}$. This comparison cannot be made, however, when the light receiving units receive too much light. When the light incident on the light receiving units becomes too great, for example, the accumulated charges reach their maximum and the light receiving elements become saturated. As a result, it is not possible to derive a contrast therefrom and auto-focusing is not possible.

It shall be noticed that the amount of accumulated charge for each light receiving unit varies with the exposure time. To resolve the saturation problem, therefore, the exposure time may be controlled to limit the amount of accumulated charge in each light receiving unit. The exposure time is controlled by, for example, controlling a shutter speed of the CCD linear sensor. One way to obtain the exposure time is to monitor the peak value for a given series of pixel voltages and modify the exposure time for the next cycle if the peak value is outside an acceptable range.

Figure 12:
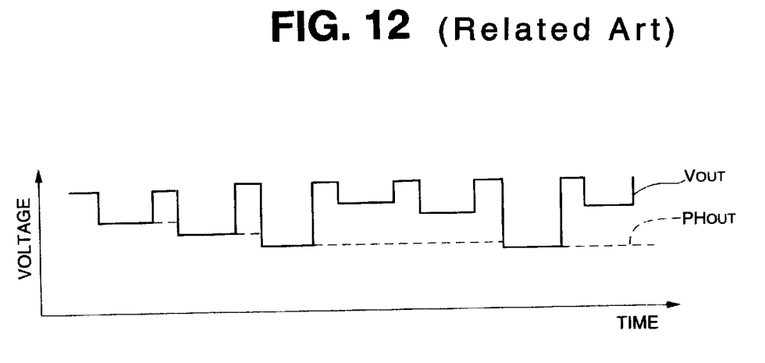
FIG. 12 is an output waveform of the linear sensor of FIG. 11.

The circuit of FIG. 11 provides a peak detecting unit 114 which detects and holds the peak value using a diode 112 and a capacitor 113. A buffer 115 stores the peak value for transmission to a buffered output $PH_{out}$. As shown in FIG. 12, the peak value $PH_{out}$ follows the peak values for the pixel voltages $V_{out}$, thus yielding the overall peak value for all of the pixel voltages.

Figure 13:
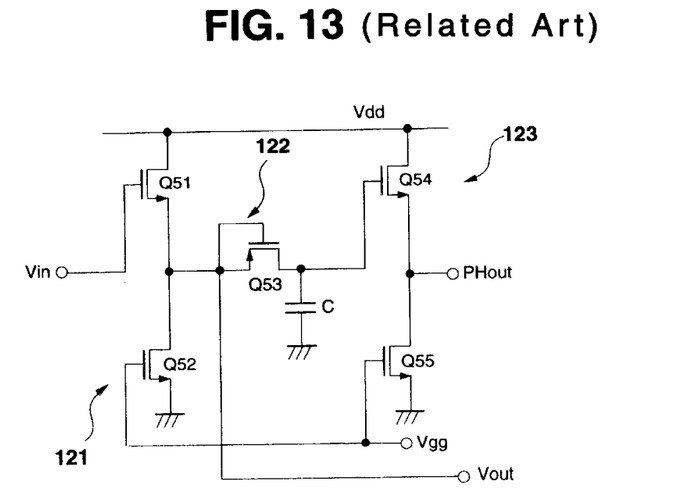
FIG. 13 is a circuit diagram of the peak hold detecting unit of FIG. 11.

The peak detecting unit 114 of FIG. 11 may be constructed as the MOS transistor circuit shown in FIG. 13. The pixel signals $CCD_{out}$ of the CCD linear sensor (100, FIG. 11) are received as an input signal $V_{in}$. The input pixel signals $V_{in}$ are sent to a source follower circuit 121 comprising an input stage of N-channel MOS transistors Q51 and Q52. The input stage functions as a buffer, generates the signal $V_{out}$ and forwards the same to a peak detecting unit 122. The peak detecting unit is comprised of a diode Q53 and a capacitor C; the diode Q53 is formed by a P-channel MOS transistor with its gate connected to its source. The peak detecting unit 122 detects the peak value $PH_{out}$ of the pixel signals $V_{out}$ and forwards this peak value to an output stage 123. The output stage is another source follower circuit and is composed of N-channel MOS transistors Q54 and Q55 which buffer the peak value $PH_{out}$.

The devices of FIGS. 11 and 13 are disadvantageous because they cannot determine the correct exposure time accurately. When the difference in light intensity-between a target object to be focused and surrounding objects is great, for example, the contrast is too high to detect and, as a result, the correct exposure time cannot be determined. To explain, when the target object has a low signal level and the surrounding objects have a high signal level, the peak detecting unit will detect the high signal levels of the surrounding objects and the exposure time will be greatly reduced to decrease the exposure to the high signal levels. Since the signal level of the target object is already low, greatly reducing the exposure time will decrease the target object signal level below detectable levels. As a result, a detectable contrast between the target object and the surrounding objects cannot be ascertained and the correct exposure time cannot be determined. Consequently, accurate auto-focusing cannot be achieved with the devices of FIGS. 11 and 13.

Another disadvantage of the devices of FIGS. 11 and 13 is that auto-focusing cannot be performed accurately for a target object. The devices of FIGS. 11 and 13 do not detect the peak value for only the target object, but detect the peak value for all of the objects in the image projected on the sensor array 102. Therefore, it is not possible to perform accurate auto-focusing for only the target object in the image.

OBJECTS AND SUMMARY OF THE INVENTION

An object of the invention, therefore, is to provide an adaptive peak value detection method and apparatus that adaptively detects peak values.

A further object of the invention is to provide an adaptive peak value detection method and apparatus which eliminates the problem of high contrast in the detected image.

Another object of the invention is to provide an adaptive peak value detection method and apparatus that improves auto-focusing for the target object.

In accordance with the above objectives, the present invention provides an adaptive peak value detection apparatus and method.

A first embodiment of the present invention determines the peak value for a peak hold section while ignoring other sections of the input signal, thus preventing a high contrast from occurring. In addition, the peak hold section is selected to allow objects in the image to be adaptively selected for peak value detection.

A second embodiment of the present invention is directed to a solid-state imaging apparatus. In this embodiment, peak values are determined for one or more signal portions of the image pixels received by the solid-stage imaging apparatus. Similar to the first embodiment, determining peak values for a portion of the image alleviates the problem of high contrast and a specific target object can be designated for peak value detection. Variants on this embodiment include controlling the exposure time of the solid-state imaging apparatus using the peak value and controlling an auto-focus on the basis of the exposure time.

A third embodiment of the present invention is directed to a camera that determines the peak value for the peak hold section and focuses the image received by the solid-state imaging element whose exposure time is controlled. The camera of this embodiment, similar to the other embodiments, prevents high contrast and specifies target objects for peak value detection since it determines the peak value for the peak hold section.

BRIEF DESCRIPTION OF THE DRAWINGS

A more complete appreciation of the present invention and many of its attendant advantages will be readily obtained by reference to the following detailed description considered in connection with the accompanying drawings, in which.

DETAILED DESCRIPTION OF THE PREFERRED EMBODIMENTS

Referring now to the drawings, wherein like reference numerals designate identical or corresponding parts throughout, the present invention will be described. The peak hold circuit of a first embodiment in the present invention detects the peak value $PH_{out}$ for a section, herein referred to as a peak hold section (to be described), of the signal supplied thereto.

Figure 1:
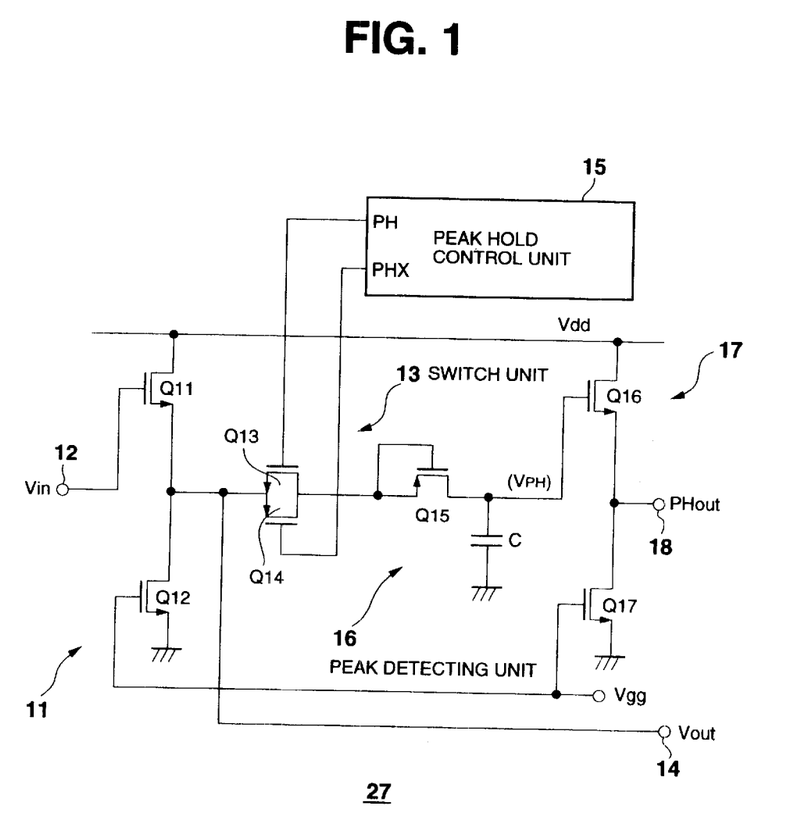
FIG. 1 is a circuit diagram of a first embodiment of the present invention.

The first embodiment may be advantageously constructed in the form of the MOS transistor circuit in FIG. 1. A peak detecting unit 16 composed of a diode Q15 and a capacitor C detects and holds the peak value $V_{PH}$ of the pixel signal $V_{out}$ which is supplied to the peak detecting unit from the input signal $V_{in}$ coupled thereto from input 12 via a source follower circuit 11. The diode Q15 is formed from a P-channel MOS transistor with its gate connected to its source. When a peak voltage occurs in the sequence of voltages produced by, for example, a CCD linear sensor, the voltage of the capacitor C rises to equal that peak voltage. On the other hand, the diode Q15 prevents the capacitor C from discharging when smaller voltages in the sequence are applied to the capacitor. In this manner, the largest voltage, or peak value, for the entire sequence voltage is detected.

Peak value detection in the present invention is adaptive. That is, the peak value $V_{PH}$ is detected for a selected section of the image. Since the signal $V_{out}$ of the CCD sensor is a series of pixel voltages representing the image projected along the sensor array, selecting a peak hold section of the series of pixel voltages selects a section of the image.

A switch 13 selectively passes the series of pixel voltages, to the peak hold detecting unit 16 thereby selectively switching a peak hold section. The switch 13 may be constructed as a semiconductor switch composed of an N-channel MOS transistor Q13 connected in parallel to a P-channel MOS transistor Q14. Such a switch is operated by applying voltages opposite in polarity to the gates of the MOS transistors Q13, Q14. Thus, the switch is opened by applying a forward bias to the gate of Q13 while applying a reverse bias to the gate of Q14. The switch is closed by applying the biases in the reverse manner.

The peak hold control unit controls adaptive selection by causing the switch to select the section of the CCD output voltages (e.g., the pixel voltages) designated as the peak hold section. When the switch is constructed as the semiconductor switch unit of FIG. 1, for example, the peak hold control unit generates pulses PH and PHX which bias the gates of Q13 and Q14, respectively, to open and close the switch unit. In this manner, the peak hold circuit selects a peak hold section.

The present invention, in addition, provides means for selecting a plurality of peak hold sections. That is, a plurality of sections of the image are designated for peak detecting and auto-focusing. The sections may be auto-focused at different times or, in the alternative, may be focused simultaneously.

Additionally, buffers may be incorporated as input and output stages. Using MOS transistors as in FIG. 1, for example, source follower circuits 11 and 17 may constitute the buffers. A first source follower circuit 11 is composed of a transistor Q11 in cascode with a transistor Q12 and is arranged as the input stage to buffer the input signal $V_{in}$. Similarly, a second source follower 17, composed of a transistor Q16 in cascode with a transistor Q17, is arranged as the output stage and buffers the output signal $PH_{out}$. A pull-up voltage Vdd is applied to each of the buffers, while a ground potential functions as a reference, or pull-down voltage. The signals to be buffered, i.e., $V_{in}$ and $V_{PH}$ (FIG. 1), are applied to the gates of the pull-up transistors Q11 and Q16, respectively, while the output signals, i.e., $V_{out}$ and $PH_{out}$, are retrieved from the drains of transistors Q11 and Q16, respectively. The buffers 11 and 17, however, may alter the signals $V_{in}$ and $V_{PH}$, respectively. This may be due to, for example, variations in transistor characteristics.

Figure 9:
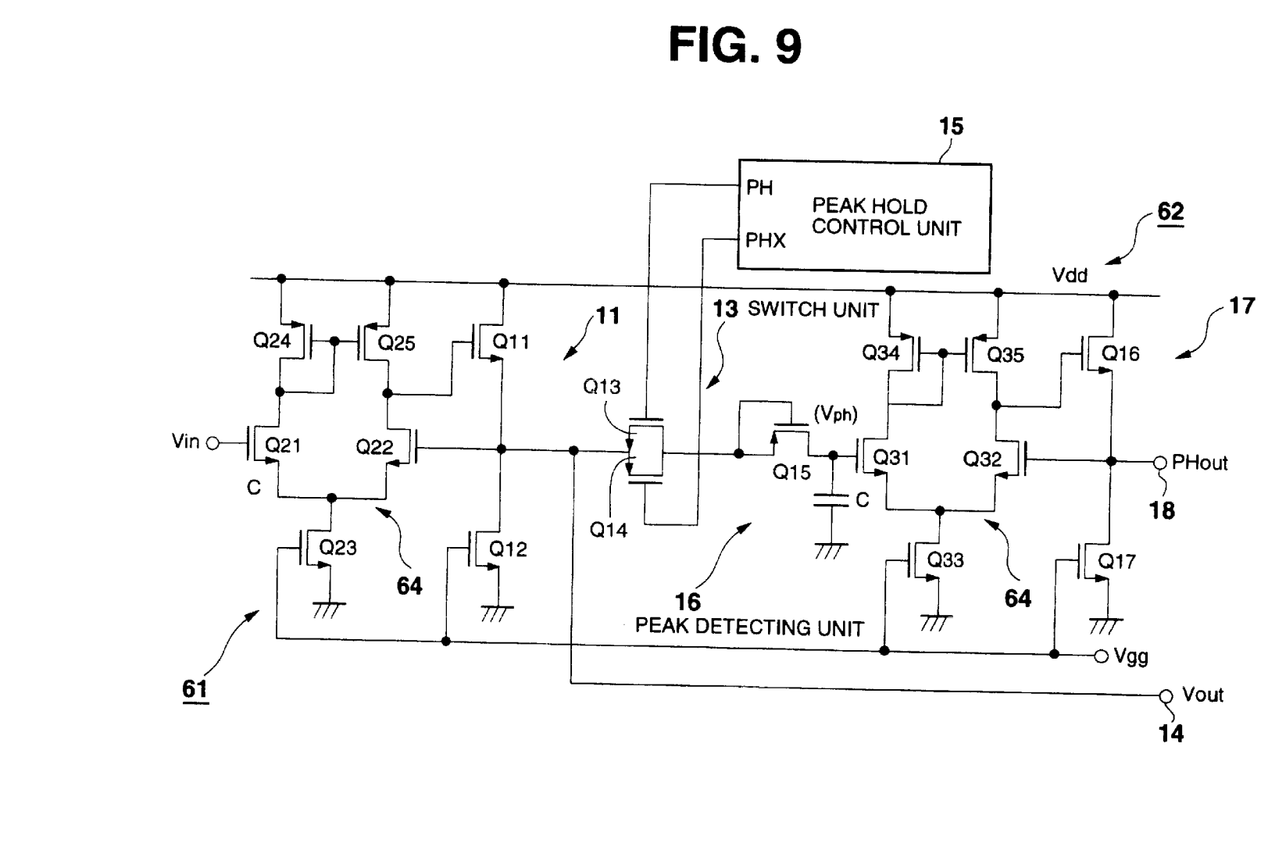
FIG. 9 is a circuit diagram of another embodiment of this invention.

FIG. 9 shows an alternative construction of the peak hold circuit according to the embodiment, just described, which ensures that the output signals precisely follow the input signals. This construction shares some common elements with the circuit of FIG. 1 and a detailed discussion of those elements is deferred. An input stage 61, 63 and a peak hold stage 62, 64 of FIG. 9 ensure that there is no DC level shift between an input voltage and an output voltage of each stage.

The stages may be constructed as differential amplifiers 63 and 64 respectively in series, each having respective pull-down transistors Q23 and Q33. Each differential amplifier has a non-inverting input (gate Q21, gate Q31) and an inverting input (gate 22, gate 32). The input signals $V_{in}$ and the peak signal $V_{PH}$ are applied to the non-inverting inputs, while the output signals of the buffers 11, 17 are applied to the inverting inputs. The differential amplifiers sense a difference between the non-inverting inputs and the inverting inputs and adjust the differential output signals from the sources of transistors Q25 and Q35 in order to maintain equality between the non-inverted and inverted input signals. In this manner, the output signals of the buffers ($V_{out}$, $PH_{out}$) are controlled to match the input signals of the differential amplifier ($V_{in}$, $V_{PH}$).

Figure 10:
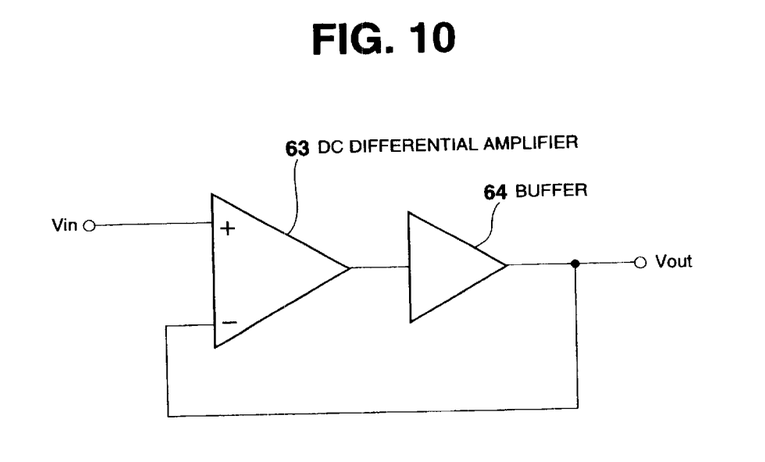
FIG. 10 is a block diagram of a feedback circuit of FIG. 9.

A block diagram of the input and peak hold stages is shown in FIG. 10. Output signal $V_{out}$ is fed back into the inverting input of the differential amplifier and, thus, compared with the input signal $V_{in}$. The amplifier adjusts its gain to ensure that the $V_{in}$ matches $V_{out}$.

Figure 3:
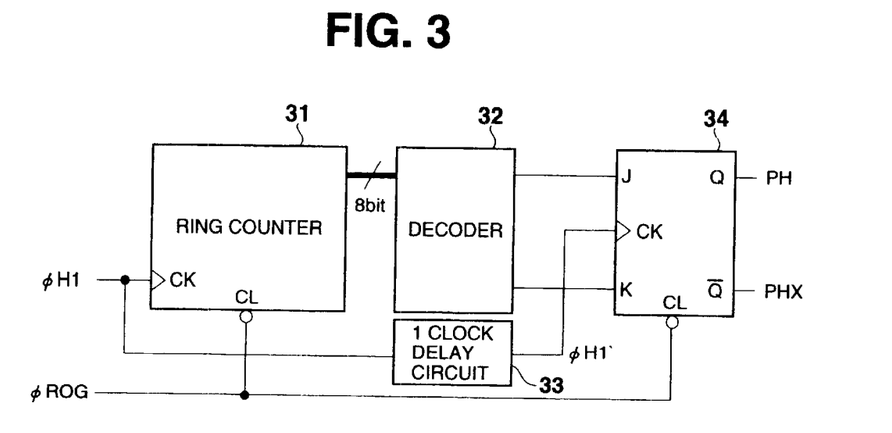
FIG. 3 is a block diagram of a peak hold control unit.

FIG. 3 is a block diagram of the peak hold control unit 15. A ring counter 31 effectively counts the pixel voltages supplied sequentially from the CCD sensor by counting the corresponding clock pulse φH1. A decoder 32 receives an eight-bit count value from the ring counter and generates a strobe signal when the count value matches a pre-programmed count indicative of the peak hold section of the pixels. The strobe is applied to a J-K flip-flop 34 which generates the pulses PH and PHX in response to the strobe. A one clock delay circuit 33 is provided to delay the transfer pulse φH1 to the J-K flip-flop in order to compensate for a delay in the decoder.

The pre-programmed count is programmed beforehand by, for example, a code generator 53 (FIG. 8) of a camera. The pre-programmed count represents a camera operator's designation of an area of the image to be focused, that is, those pixels which constitute the focus area.

The peak hold control unit of FIG. 3 is not limited to selecting a single peak hold section. A plurality of peak hold sections may be selected by programming the decoder to generate the strobe during these peak hold sections. Accordingly, the decoder strobes the J-K flip-flop when the counter generates a count value corresponding to the pixels within any of the peak hold sections. During these times, the signals PH, PHX open the switch and the peak value for these sections is determined. This peak value is employed, as will be described, to determine the correct exposure time for the signal $V_{out}$ and auto-focusing is performed for these sections.

Figure 4:
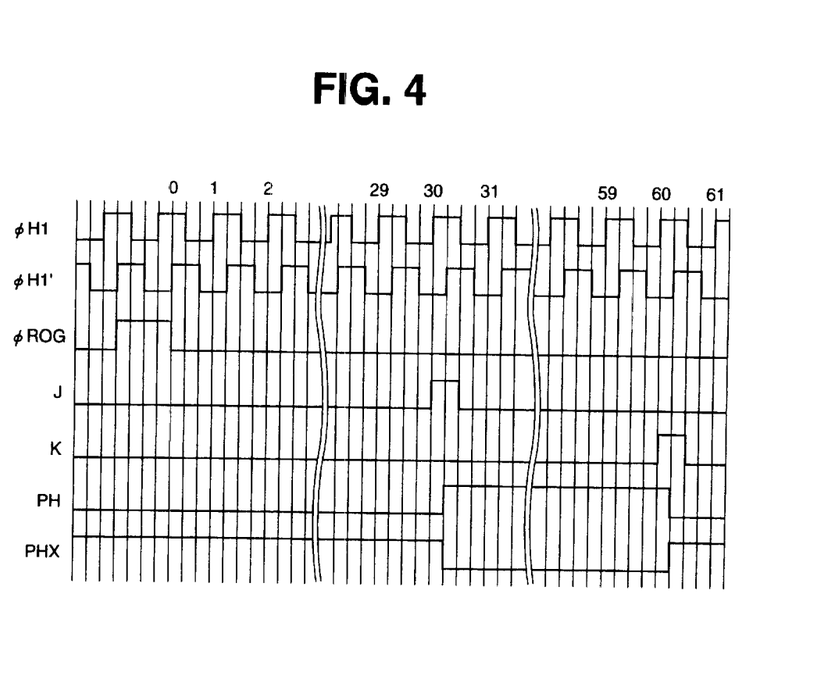
FIG. 4 is a timing chart for explaining the operation of the peak hold control unit.

The operation of the peak hold control unit of FIG. 3 will be described with reference to the timing diagram of FIG. 4.

The read-out gate pulse φROG indicates the beginning of the series of pixel voltages and is applied to the ring counter and the J-K flip-flop to reset these devices. Once the ring counter is reset, the transfer pulse φH1 causes the ring counter to increment its count value. Since the transfer pulse φH1 is synchronized with the series of pixel voltages, the ring counter effectively counts each pixel voltage in the series. In this example, the pre-programmed count stored in the decoder is set for the thirtieth to the sixtieth pixel voltages. Therefore, at the thirtieth pixel voltage, the decoder strobes the J input, turning "ON" the J-K flip-flop. In response to the strobe, the J-K flip-flop switches the PH output to a relatively high level at the thirtieth pixel along with switching the corresponding PHX signal to a relatively low level. The signals PH, PHX open the switch 13 (FIG. 1), thereby effectively forming a window during which the pixel voltages of the image are selected for peak value detection. At the sixtieth pixel voltage, the decoder strobes the K input of the J-K flip-flop and the switch is closed, thus ending the peak hold detection.

Figure 5:
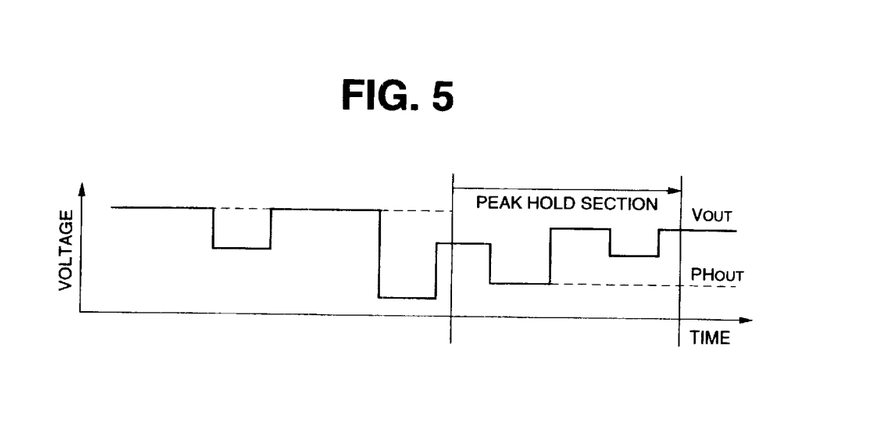
FIG. 5 is an output waveform according to the present invention.

FIG. 5 shows the results of the operation discussed with reference to FIG. 4. As will be appreciated, the peak value $PH_{out}$ is detected for the peak hold section while the peak values present during the other sections are ignored. With the present invention, therefore, the exposure time may be determined on the basis of a selected portion of the image and auto-focusing is performed for only the target object.

Figure 2:
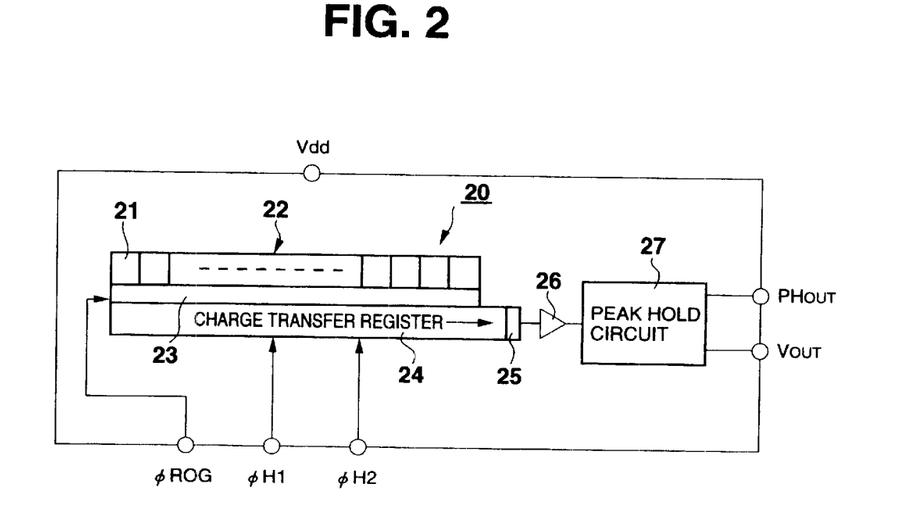
FIG. 2 is a block diagram of a second embodiment of the present invention.

Another feature of the present invention is directed to a solid-state imaging element. As shown in FIG. 2, a CCD linear sensor 20 functions as the solid-state imaging element with linear sensor 22 composed of light receiving units 21. The light receiving units comprise a sensor array of pixel elements which generate pixel signals in response to the image projected therefrom. These pixel signals are transferred out of the sensor array 22 by the pixel CCD transfer operation in a manner similar to that performed in the device of FIG. 11. The pixel signals are transferred in response to the read out gate pulse φROG and synchronously timed to the transfer pulses φH1, φH2 to be read out serially from the pixel elements, via a read-out gate unit 23. A charge transfer register 24 transfers these pixel signals to a charge/voltage converting circuit 25 for conversion to corresponding voltages. A buffer 26 buffers the pixel voltages to the peak hold circuit 27. The peak hold circuit (such as shown in FIG. 1) receives the pixel voltages and detects the peak value of one or more portions thereof.

Figure 6:
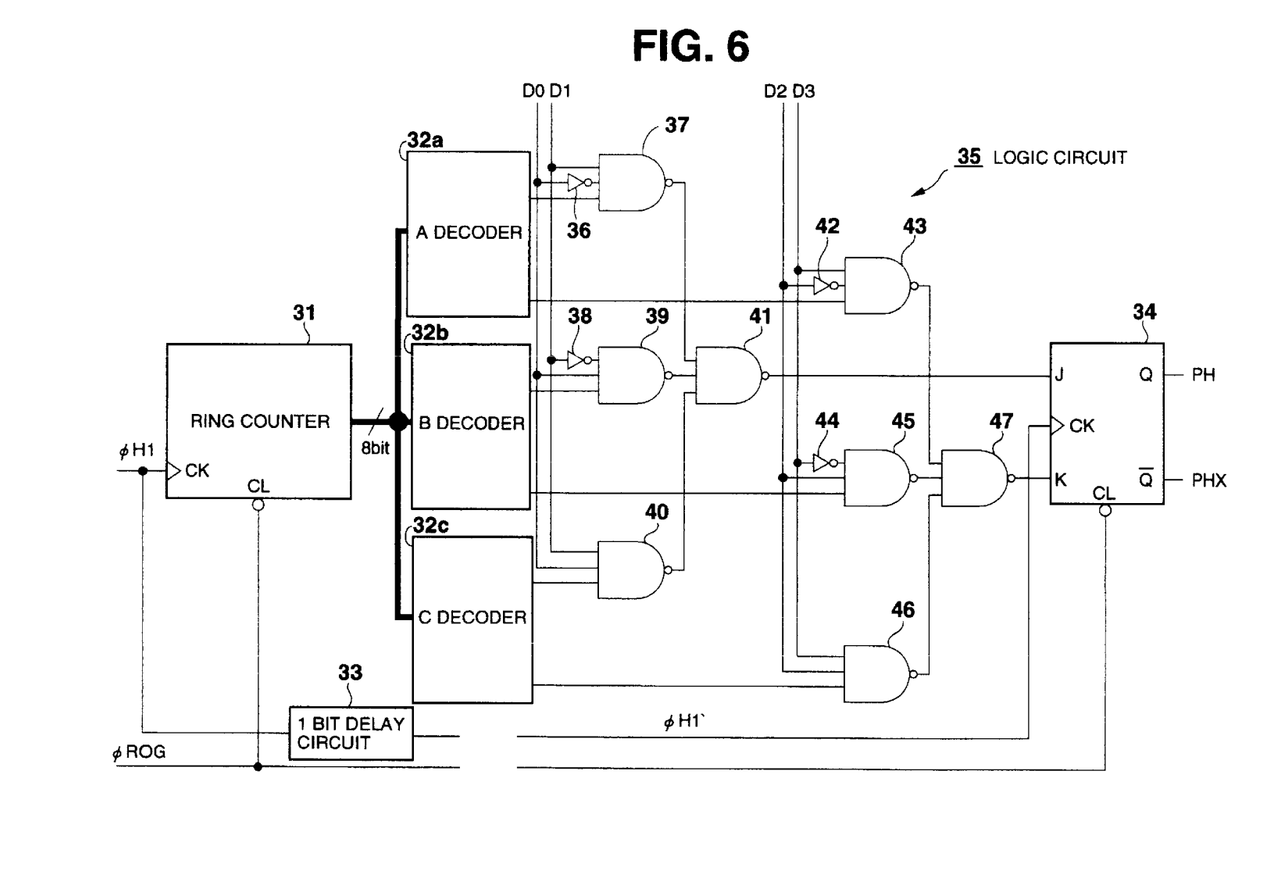
FIG. 6 is a block diagram of another possible embodiment of the peak hold control unit.

Another embodiment of the peak hold control unit is shown in FIG. 6. In this embodiment decoding of the count produced by ring counter 31 is performed by a plurality of decoders 32a, b, c. Each decoder is pre-programmed to output a strobe signal for a respective desired section of the image. Therefore, a plurality of peak hold sections (A, B, C) may be controlled by this peak hold control unit, and image objects within these peak hold sections will be focused. The NAND gate circuitry between the decoders and the J-K flip flop 34 determines which peak hold section (A, B, C) is selected for peak value detection.

A peak hold section is designated by biasing the code data lines (D0, D1, D2, D3) which are fed into the NAND gate inputs. The table in FIG. 7, for example, shows one arrangement for biasing the code data lines to designate different peak hold sections. This particular table designates a respective peak hold section for a respective combination of code data lines. However, it shall be appreciated that combinations other than those shown in the table may be selected which designate a plurality of peak hold sections. Alternatively, the NAND gate circuitry can be modified to select combinations of peak hold sections including a combination which includes all of the peak hold sections. Selecting a combination of sections would result in autofocusing several objects simultaneously.

In more particular detail, NAND gates 37, 39, 40 and NAND gate 41 generate a signal for the J input of the J-K flip flop. Similarly, gates 43, 45, 46 and 47 generate a signal for the K input of the J-K flip flop. The difference between the operation of NAND gates 37, 39, 40 and 41 and NAND gates 43, 45, 46 and 47 is that the code data signals D0, D1 supplied to NAND gates 37, 38, 40 and 41 are biased at a different time than the code data signals D2, D3 supplied to NAND gates 43, 45, 46 and 47. This is because, as shown in FIG. 4, the J input (controlled by D0, D1) is strobed at the 30th pixel to turn on the J-K flip flop, whereas the K input (controlled by D2, D3) is strobed later at the 60th pixel to turn off the J-K flip flop.

Figure 7:
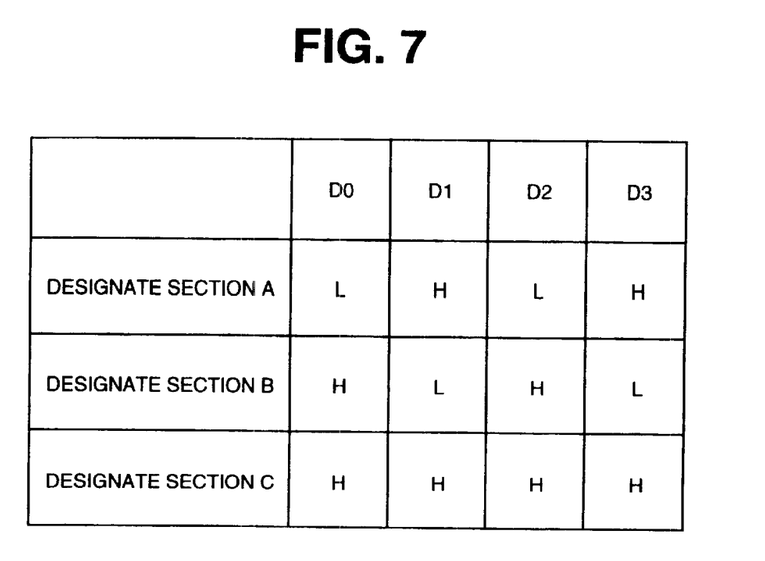
FIG. 7 is a logic table for describing the operation of the logic gates in FIG. 6.

The logic function of the table in FIG. 7 is a function of the NAND gate circuitry. The signal levels (high or low) of the code data are modified by inverters 36, 38, 42, 44 as needed to conform with the logic table of FIG. 7. Thus, NAND gates 37 and 43 select the A peak hold section when D1 and D3 are high and Do and D2 are low; NAND gates 39 and 45 select the B peak hold section when D1 and D3 are low and D0 and D2 are high; NAND gates 40 and 46 select the C peak hold section when D1, D3, D0 and D2 are high. NAND gates 41 and 47 determine if any of the peak hold sections (A, B, C) are selected and output the aforementioned strobe signal to the J and K inputs in response thereto. In this manner, the J-K flip flop is strobed during the peak hold sections and the signals PH, PHX from the J-K flip flop cause the switch unit 13 (FIG. 1) to select the pixels only in the peak hold sections (A, B, C).

Each of the embodiments, thus, performs peak detection for the designated peak hold sections while ignoring other sections of the image. From this, the correct signal level for the image is obtained and the exposure time for the next cycle is correctly determined. Using the corrected exposure time means that the pixel signal $V_{out}$ (FIG. 1) is more accurate. Thus, auto-focusing which employs the more accurate pixel signal $V_{out}$ is also more accurate.

Figure 8:
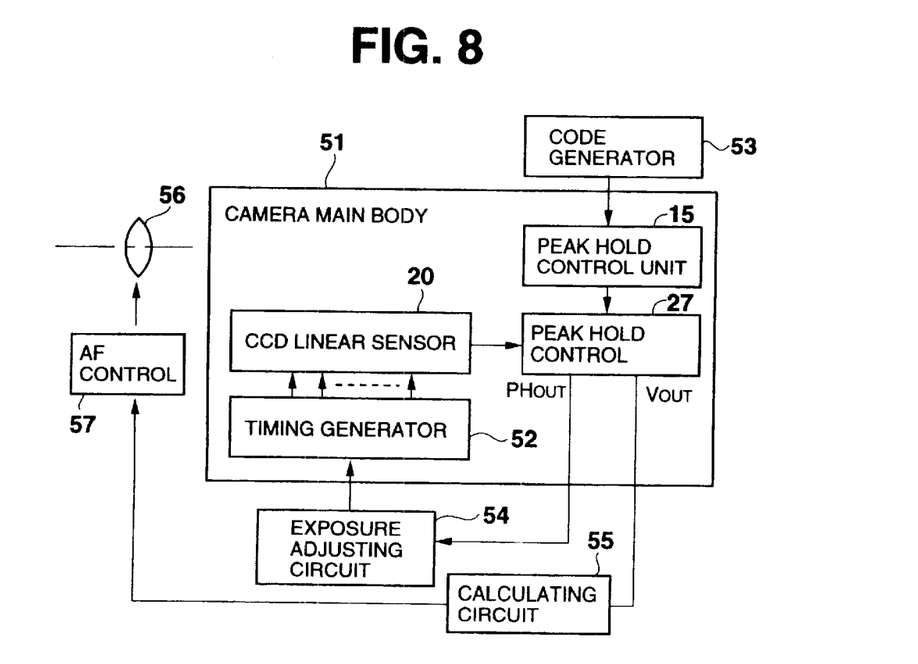
FIG. 8 is a block diagram of a camera according to a third embodiment of the present invention.

An application of the present invention to a camera which focuses the image on the basis of the corrected exposure time is illustrated in FIG. 8. As shown, the image is received by a camera lens 56 and directed to appropriate imaging equipment (not shown) which projects the image onto the CCD linear sensor. The camera lens is focused by an AF (auto-focus) control circuit 57 which determines the correct focal point for the camera lens on the basis of calculations performed by a calculating circuit 55. These calculations are made by comparing the pixel voltages in the signal $V_{out}$ provided by peak hold circuit 27. Since the accuracy of the calculating circuit is dependent upon the accuracy of the pixel voltages, controlling the exposure time of the CCD linear sensor 20 to the image results in the correct level for the signal $V_{out}$.

To obtain the correct exposure time, the target object is initially determined, that is, the operator of the camera selects which object is to be the target. Once the target is determined, a code generator 53 (FIG. 8) generates a code corresponding to the selected peak hold sections of the target object. The peak hold control unit 15 controls the peak hold circuit 27 to obtain and hold the peak value $PH_{out}$ of the pixel voltages in the peak hold sections designated by code generator 53. An exposure adjusting circuit 54 utilizes the peak value $PH_{out}$ to determine the correct exposure time for the next cycle and a timing generator 52 controls the timing of the exposure of the CCD linear sensor to the image in response to the determined exposure time. In this manner, the correct exposure time is determined and a more accurate detection of $V_{out}$ is performed, thereby improving the autofocusing operation.

With the aforementioned embodiments, an appropriate signal level for the peak value is obtained and, in addition, a target object can be isolated for focusing. While these embodiments have been described in connection with the particular circuits shown in the drawings, the present invention is not limited thereby. It is therefore, to be understood that, within the scope of the appended claims, the invention may be practiced otherwise than as specifically described herein.

We claim:

1. A peak hold circuit comprising:

peak detecting means for detecting and holding a peak value of an input signal supplied to an input thereof;

switch means coupled to said input of said peak detecting means, for selectively supplying a section of the input signal as a peak hold section to said peak detecting means;

peak hold control means for controlling said switch means to select said peak hold section causing said peak detecting means to detect the peak value for said peak hold section and to ignore other sections of the input signal;

a first buffer which receives a solid-state imaging signal and generates the input signal therefrom;

a second buffer circuit which receives said peak value for said peak hold section and generates a buffered peak value therefrom;

a first voltage follower circuit coupled to said first buffer circuit for maintaining the input signal equal to the solid-state imaging signal; and a second voltage follower circuit coupled to said second buffer circuit for maintaining the buffered peak value equal to the peak value for said peak hold section.

2. The peak hold circuit as claimed in claim 1 wherein the first voltage follower circuit and the first buffer circuit constitute a feedback circuit, and wherein the second voltage follower circuit and the second buffer circuit constitute a feedback circuit.

3. A solid-state imaging apparatus comprising:

solid-state imaging means having a plurality of pixel elements for receiving an image and for outputting successive pixel signals produced by the pixel elements in response thereto;

peak hold means responsive to said successive pixel signals from said solid-state imaging means for detecting and holding a peak value of a selected portion of said pixel signals representing a peak hold section of said pixel elements, said pixel hold section being less than all of said pixel elements;

switch means for selecting the pixel signals constituting said selected portion of pixel signals from which said peak value is detected;

peak hold control means for controlling said switch means to select said selected portion of pixel signals for peak value detection while ignoring other portions of said pixel signals;

counter means for counting a clock signal supplied thereto and thereby outputting a count signal indicative of the portions selected for peak value detection;

decoder means for decoding said count signal thereby to output a decoded signal indicating when the portions selected for peak value detection occur in the input signal;

pulse generating means responsive to said decoded signal to generate a switching pulse to activate said switch means to select said portions selected for peak value detection; and wherein said decoder means comprises a plurality of decoders for indicating when the pixel signals are produced from said peak hold sections of said pixel elements.

4. A camera, comprising:

a solid-state imaging element for receiving an image thereon and generating an input signal in response thereto;

a peak hold circuit including a peak detecting means for detecting and holding a peak value of the input signal supplied to an input thereof, switch means coupled to said input of said peak detecting means, for selectively supplying a section of the input signal as a peak hold section to said peak detecting means, peak hold control means for controlling said switch means to select said peak hold section causing said peak detecting means to detect the peak value for said peak hold section and to ignore other sections of the input signal, a buffer circuit which receives said peak value for said peak hold section and generates a buffered peak value therefrom, and a voltage follower circuit coupled to said buffer circuit for maintaining the buffered peak value equal to the peak value for said peak hold section;

exposure adjusting means for adjusting an exposure time of said solid-state imaging element on the basis of the peak value for said peak hold section; and focus control means for controlling the focus of the image received by said solid state imaging element in response to the input signal generated by said solid-state imaging element whose exposure time has been adjusted by said exposure adjusting means.

5. A camera, comprising:

solid-state imaging means having a plurality of pixel elements for receiving an image and for outputting successive pixel signals produced by the pixel elements in response thereto;

peak hold means responsive to said successive pixel signals from said solid-state imaging means for detecting and holding a peak value of a selected portion of said pixel signals representing a peak hold section of said pixel elements, said pixel hold section being less than all of said pixel elements;

switch means for selecting the pixel signals constituting said selected portion of pixel signals from which said peak value is detected;

peak hold control means for controlling said switch means to select said selected portion of pixel signals for peak value detection while ignoring other portions of said pixel signals;

counter means for counting a clock signal supplied thereto and thereby outputting a count signal indicative of the portions selected for peak value detection;

decoder means for decoding said count signal thereby to output a decoded signal indicating when the portions selected for peak value detection occur in the successive pixel signals, said decoder means including a plurality of decoders for indicating when the pixel signals are produced from said peak hold sections of said pixel elements;

pulse generating means responsive to said decoded signal to generate a switching pulse to activate said switch means to select said portions selected for peak value detection;

exposure adjusting means for adjusting an exposure time of said solid-state imaging means on the basis of the peak value; and focus control means for controlling the focus of the image received by said solidstate imaging means in response to the pixel signals outputted by said solid-state imaging means whose exposure time has been adjusted by said exposure adjusting means.

* * * * *